Patented Feb. 28, 1939

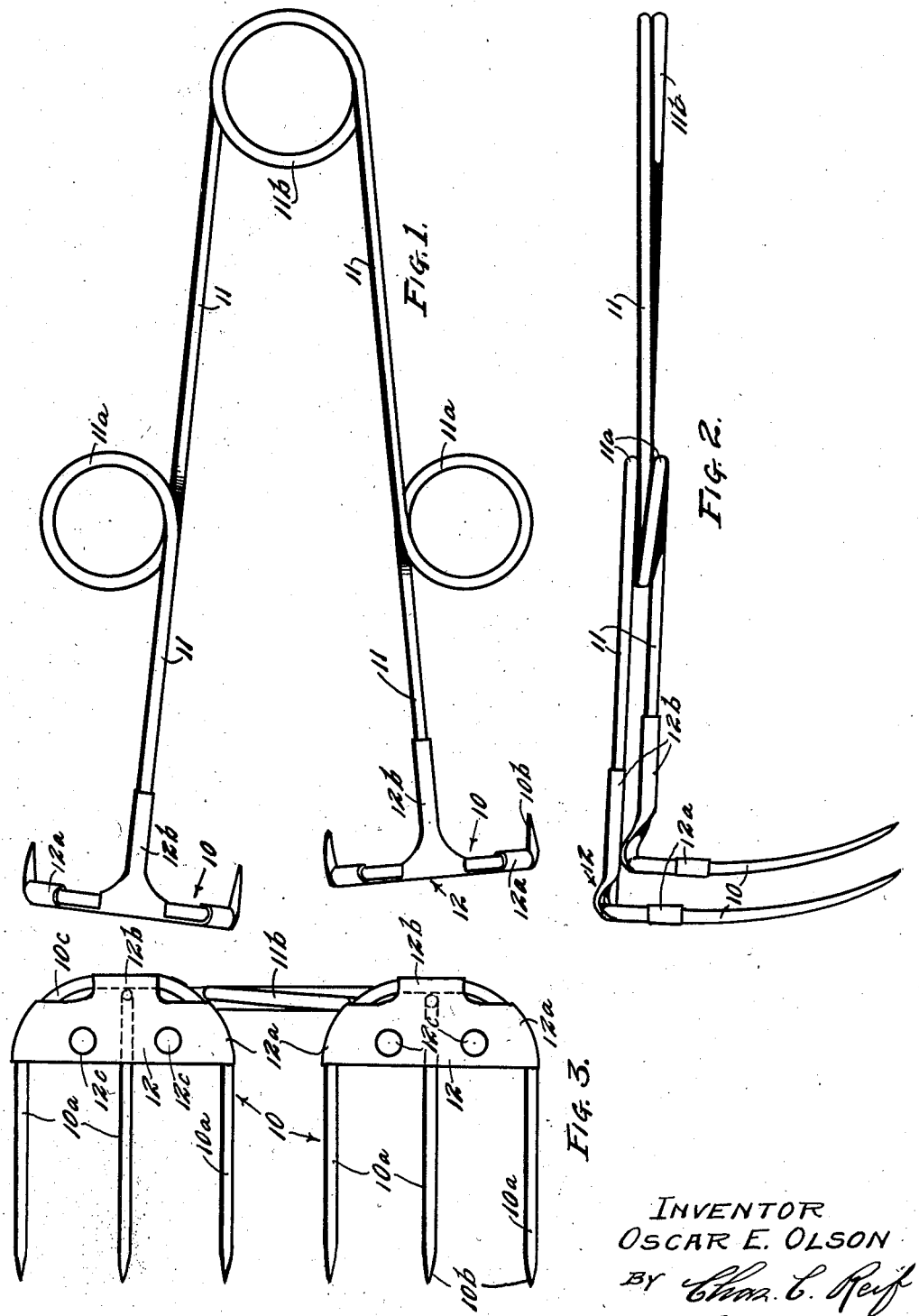

2,148,772

UNITED STATES PATENT OFFICE 2,148,772

HAND CULTIVATOR AND WEEDER

Oscar Edward Olson, Minneapolis, Minn.

Application March 22, 1937, Serial No. 132,309

5 Claims. (Cl. 97—63)

This invention relates to a cultivator and weeder and while the device may be made in various sizes for different uses, it particularly is designed for a small cultivator and weeder adapted to be held in and operated by one hand.

It is desirable to have a small implement which can be used to cultivate flower beds and other beds containing comparatively small plants and one which can be varied in width to suit the distance between the plants. It is also desirable to have such an implement by means of which small weeds which have been uprooted may be lifted and removed from the bed if desired.

It is an object of this invention, therefore, to provide a very simple cultivator and weeder preferably of the small hand-operated type which can be used as a cultivator of different widths so as to be used between plants in a bed.

It is a further object of the invention to provide such an implement comprising a pair of toothed members or forks which can be moved to cultivate the ground and which can also be moved together to vary the effective width of the implement.

It is another object of the invention to provide a hand-operated cultivator and weeder comprising a pair of forks or toothed members adapted to be moved toward and from each other and adapted to be brought into substantal alinement longitudinally of the device.

It is still another object of the invention to provide a hand-operated cultivator and weeder comprising a pair of forks or toothed members disposed in substantially vertical planes and having handles or rods extending horizontally therefrom and resiliently connected so that said members can readily be moved toward and from each other, said rods or handles preferably being provided with means forming finger holes.

These and other objects and advantages of the invention will be fully set forth in the following description made in connection with the accompanying drawing in which like reference characters refer to similar parts throughout the several views and in which:—

Fig. 1 is a top plan view of the device;

Fig. 2 is a view in side elevation of the device; and

Fig. 3 is a view in front elevation of the device.

Referring to the drawing, a device is shown comprising a plurality of toothed members or forks 10. While the number of these might be varied, in the embodiment of the invention illustrated two are shown. Each fork 10 is provided with a plurality of teeth 10a and while various numbers of teeth might be used, the forks are shown as each having three teeth. Teeth 10a are shown as made of small rods or wires and the same are slightly curved or hook-shaped as shown in Figs. 1 and 2 and they are provided with sharpened ends 10b. While the forks might be variously made, in the embodiment of the invention illustrated they are shown as having the outer teeth 10a formed from a single rod or wire having the upper curved portion or bight 10c which connects the outer teeth 10a. The central tooth 10a extends substantially vertically and is then bent substantially at a right angle to extend rearwardly and substantially horizontally and is continued as a handle or rod 11. A clip 12 formed of sheet metal has side portions 12a which are bent and clamped around portion 10c at the upper end of each outer tooth 10a. Clip 12 has a central portion 12b which extends over the top of portion 10c and at its rear is bent around and clamped on the forward portions of members 11, which members as previously stated continue forwardly beneath portion 10c and are bent down to form the central tooth 10a. Clips 12 are shown as having holes 12c therethrough. The members 11 are formed into circular coils 11a intermediate their ends, which coils are disposed at the outer sides of members 11. Members 11 are formed into and connected at their ends opposite the forks 10 by a coil 11b of circular formation. The rods or wires 11 are of resilient material and said rods are thus resiliently connected at their ends. It will be noted that the rods 11 are of different lengths. With this construction when rods 11 are moved toward each other the forks 10a can be brought into substantial alinement longitudinally of the device. The forks are thus in overlapping relation and as seen in Fig. 2 the fork on the short member 11 will have its upper portion passing beneath the rear portion of clip 12.

In operation, the operator will grasp the implement from the top, preferably placing the thumb in one loop or coil 11a and the second finger in the other loop 11a. The device will thus be firmly held in the hand and the forks 10 may be used to dig or to cultivate the ground by a longitudinal bodily movement of the device. The device can be used of the full width shown in Fig. 3 or the rods 11 might be further separated to increase this width. If it is desired to have a smaller width to get in between some plants or to get close to a plant the rods 11 can be moved toward each other to bring forks 10 closer together and this movement can be continued until the forks are substantially in alinement longitudinally of the device. When pressure is released on members 11 they will move to the positions shown in Figs. 1 and 3 by the resiliency of loop 11b. This movement of forks 10 toward and from each other can also be used as a cultivating movement since the forks do not move in the same plane. With the described movements the ground can be nicely mulched or cultivated and the small weeds therein uprooted. After the weeds have been uprooted or dug out they can be raked together by moving the device longitudinally and using it as a rake. The weeds can thus be collected and when so collected they can be picked up by being grasped between forks 10 by moving the latter together and lifted from the bed. The device can thus be used somewhat as tongs and the weeds need not be touched with the hands. The device can be easily and quickly moved to a smaller or larger width in cultivating around and between plants so that the work can be done very rapidly and with little danger of striking or injuring a plant.

From the above description it is seen that applicant has provided an extremely simple and highly efficient cultivator and weeder. The device can be used as a digger, cultivator, rake, weeder and weed remover. The structure is very simple and yet the device is very rugged and durable. In practice the same will preferably be painted or enameled to prevent corrosion to make it convenient for handling. The device has been amply demonstrated in actual practice and found to be very successful and efficient.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What is claimed is:—

1. A hand cultivator and weeder comprising a plurality of laterally spaced forks disposed in substantially vertical planes, members extending substantially horizontally from said forks and resiliently connected at their other ends, said members being of different lengths whereby said members may be moved toward each other and said forks moved into overlapping relation.

2. A hand cultivating and weeding device comprising a plurality of laterally spaced forks disposed in substantially vertical planes, rods extending from said forks and resiliently connected at their other ends so as to normally move apart and position said forks in laterally spaced relation, said rods being movable toward and from each other, whereby said forks may in operation be reciprocated laterally by movement of said rods and the resilient action thereof and said forks may also be moved through the ground by a longitudinal movement of said device.

3. A hand cultivator and weeder comprising a pair of toothed members disposed in substantially vertical planes, rods extending substantially horizontally therefrom and resiliently connected at their other ends so as to normally be urged apart, said members being movable in operation toward and from each other and into substantial alinement lengthwise of said rods.

4. A hand cultivator and weeder comprising a pair of toothed members disposed in substantially vertical slightly spaced planes, a pair of small rods or wires extending from said members respectively horizontally and formed into a resilient loop at their other ends so that said rods are urged to separated position, said rods being provided with loops between said resilient loop and said toothed members to form finger holds by means of which said rods may be moved together whereby said forks may be reciprocated laterally.

5. A hand cultivator and weeder comprising a pair of cultivating members, rods extending from said members substantially at right angles thereto and forming handles, said rods being connected at their other ends for reciprocation in operation toward and from each other so that said members may be moved toward and from each other, said members being disposed in offset vertical planes so as to be movable into overlapping relation by movement of said rods.

OSCAR EDWARD OLSON.